United States Patent [19]

Yamakami

[11] Patent Number: 5,528,959
[45] Date of Patent: Jun. 25, 1996

[54] MULTI-DRIVING ASSEMBLY OF VEHICLE POWER SEAT

[75] Inventor: Gensaku Yamakami, Gunma-ken, Japan

[73] Assignee: Mitsuba Electric Manufacturing Co., Ltd., Japan

[21] Appl. No.: 293,512

[22] Filed: Aug. 22, 1994

[30] Foreign Application Priority Data

Aug. 24, 1993 [JP] Japan .................................. 5-230843

[51] Int. Cl.⁶ .............................. A47C 3/00; B60N 2/02; F16D 27/118
[52] U.S. Cl. .................. 74/665 GD; 74/665 G; 192/90; 248/394; 248/396; 297/330
[58] Field of Search .................. 74/89.15, 665 G, 74/665 GD; 248/394, 396; 192/90; 297/330

[56] References Cited

U.S. PATENT DOCUMENTS

| | | | |
|---|---|---|---|
| 2,886,094 | 5/1959 | Pickles | 297/330 X |
| 2,905,228 | 9/1959 | Latimer | 297/330 X |
| 2,920,684 | 1/1960 | Fante et al. | 297/330 |
| 2,924,265 | 2/1960 | Himka | 297/330 |
| 2,929,438 | 3/1960 | Homier | 297/330 X |

FOREIGN PATENT DOCUMENTS 2153218  8/1985  United Kingdom .................. 297/330

*Primary Examiner*—Allan D. Herrmann
*Attorney, Agent, or Firm*—Oliff & Berridge

[57] ABSTRACT

A multi-driving assembly of a vehicle power seat for adjusting forward and backward movement and height of the front and rear portions of the seat. At a left side of the motor shaft of an electric motor (central portion of a vehicle) where no wide space is secured, a first tightening member having no clutch is screwed to a first rotating screw shaft, which is provided with a first clutch to adjust forward and backward movement of the seat. At a right side (door side), second tightening members each having a second clutch provided therein are screwed to a second rotating screw shaft to adjust the height of the front and rear portions of the seat.

11 Claims, 6 Drawing Sheets

MULTI-DRIVING ASSEMBLY OF VEHICLE POWER SEAT

BACKGROUND OF THE INVENTION

1. Field of the Invention

The present invention relates to a multi-driving assembly of a power seat for a vehicle such as a private car, a bus or a truck.

2. Description of the Related Art

Conventionally, some vehicles of this kind include, for example, a seat whose respective operating parts for performing forward and backward movement thereof and vertical movement of front and rear portions of the seat section are selectively adjustable according to an occupant's physical constitution. In this case, a seat in which each of the operating parts are operated by separate electric motors causes problems in that the number of components is high, and the seat itself is increased in size.

Therefore, an attempt may be made to selectively perform these several seat operations, using a single motor with on-off operation switches corresponding to each operation. In this case, it may be proposed to screw several tightening members corresponding to each seat operation to a rotating screw shaft rotating in accordance with driving of the motor, thereby selectively performing a seat operation in accordance with the on operation of each of the operating switches.

When the seat has such constitution as proposed above, it is necessary to expand the forward and backward movement of the seat to correspond with height differences of the occupants. However, it is not necessary to expand the vertical movement of the seat section. As a result, when the tightening members corresponding to each of these seat operations are screwed to one rotating screw shaft, a relatively long rotating screw shaft is required. Further, there is a possibility such a long rotating screw shaft will extend from front and rear end portions of the seat. Therefore, it may be proposed to arrange two rotating screw shafts in parallel with each other at a central portion and at a door side of the vehicle, respectively, one being used for forward and backward movement of the seat, and the other being used for vertical movement of the seat. However, there causes a problem in securing a wide space at a central portion (a side of the console box) due to installation of a transmission for various wiring and a propeller shaft, and it becomes impossible to provide a tightening member having a clutch that increases in size at the central portion of the vehicle.

SUMMARY OF THE INVENTION

The present invention has been developed in view of the problems described above.

It is an object of the present invention to provide a multi-driving assembly of a vehicle power seat that overcomes the problems described above.

In accordance with the present invention, there is provided a multi-driving assembly of a vehicle power seat featuring at least forward and backward movement of the seat and vertical movement of front and rear portions of the seat, which is accomplished by a single electric motor. Several rotating screw shafts are arranged in parallel with one another facing front and rear ends of the vehicle to which a motor driving force is transmitted from the electric motor by way of a power transmission path. A tightening member is screwed to a rotating screw shaft arranged at a central portion of the vehicle, and a tightening member is screwed to a rotating screw shaft arranged at a door side of the vehicle. The first clutch is provided in a power transmission path toward the rotating screw shaft arranged at a central portion of the vehicle, and the second clutch is provided in the tightening member arranged at a door side of the vehicle.

In this construction, the multi-driving assembly using a single electric motor may be comfortably provided under the seat with effective use of the space under the seat.

BRIEF DESCRIPTION OF THE DRAWINGS

The invention will now be described in detail with reference to the accompanying drawings, in which.

DETAILED DESCRIPTION OF PREFERRED EMBODIMENTS

Figure 1:
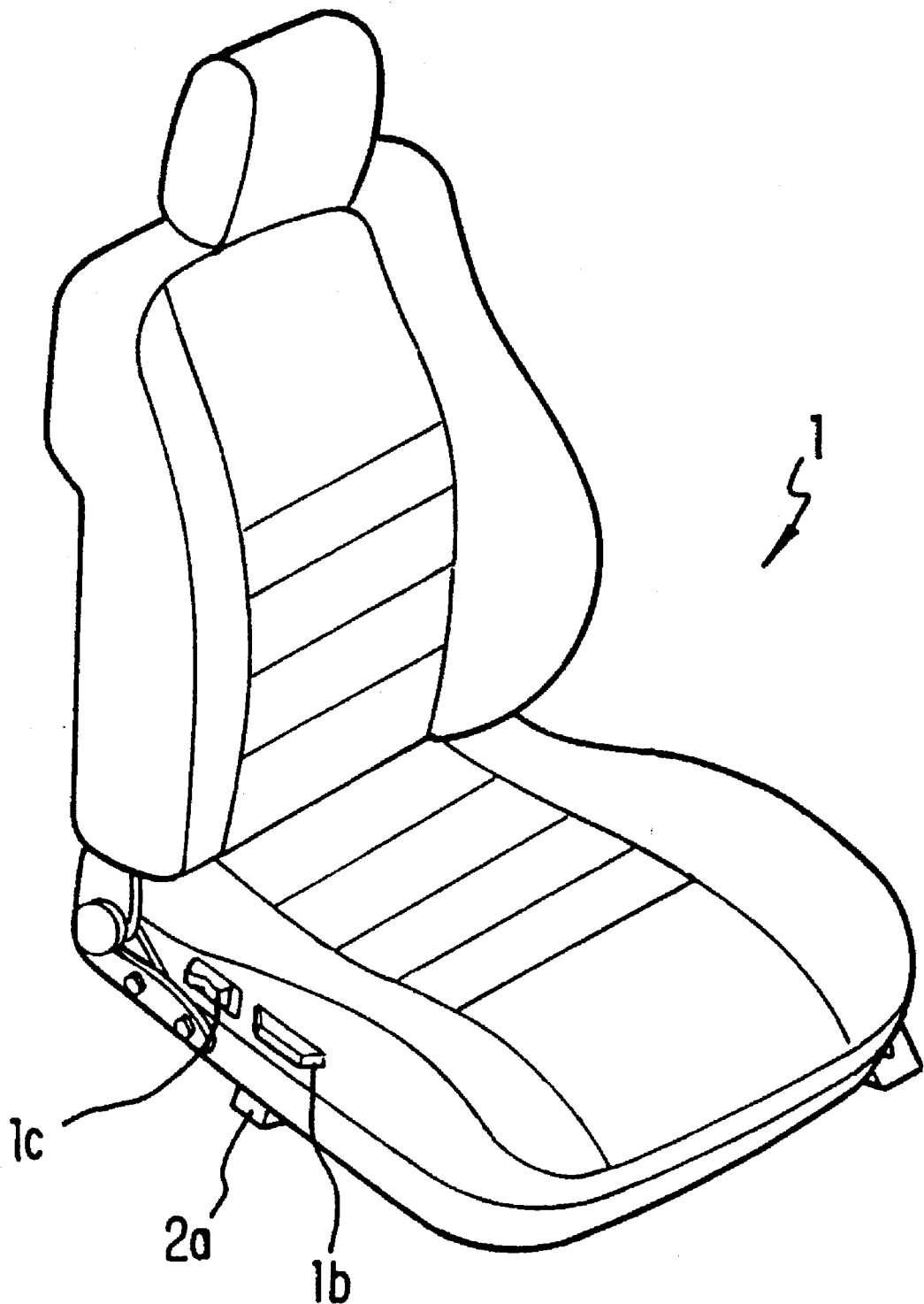
FIG. 1 is a perspective view showing an entire seat.
Figure 2:
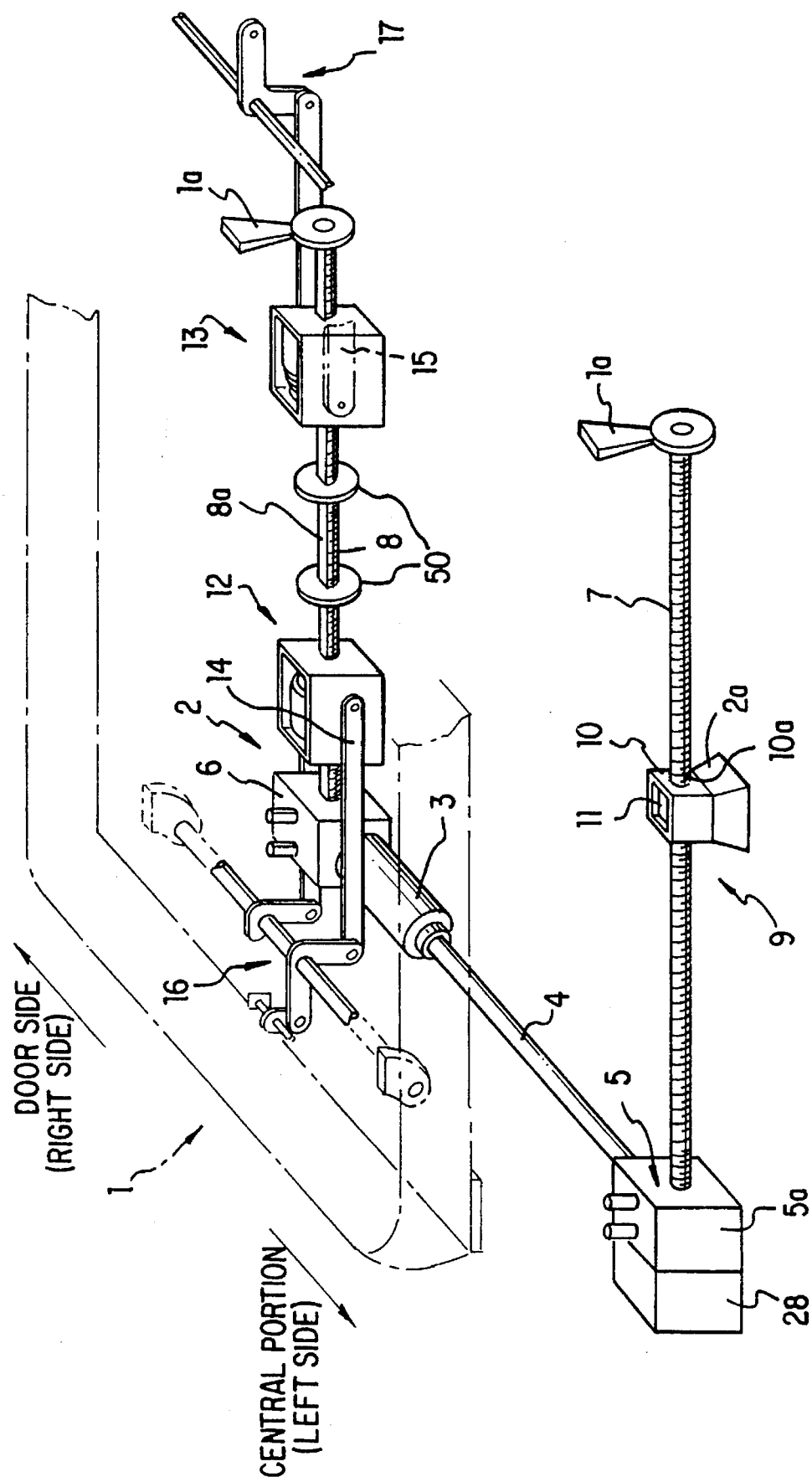
FIG. 2 is a schematic illustration of an electric driving assembly showing a first embodiment according to the present invention.
Figure 3:
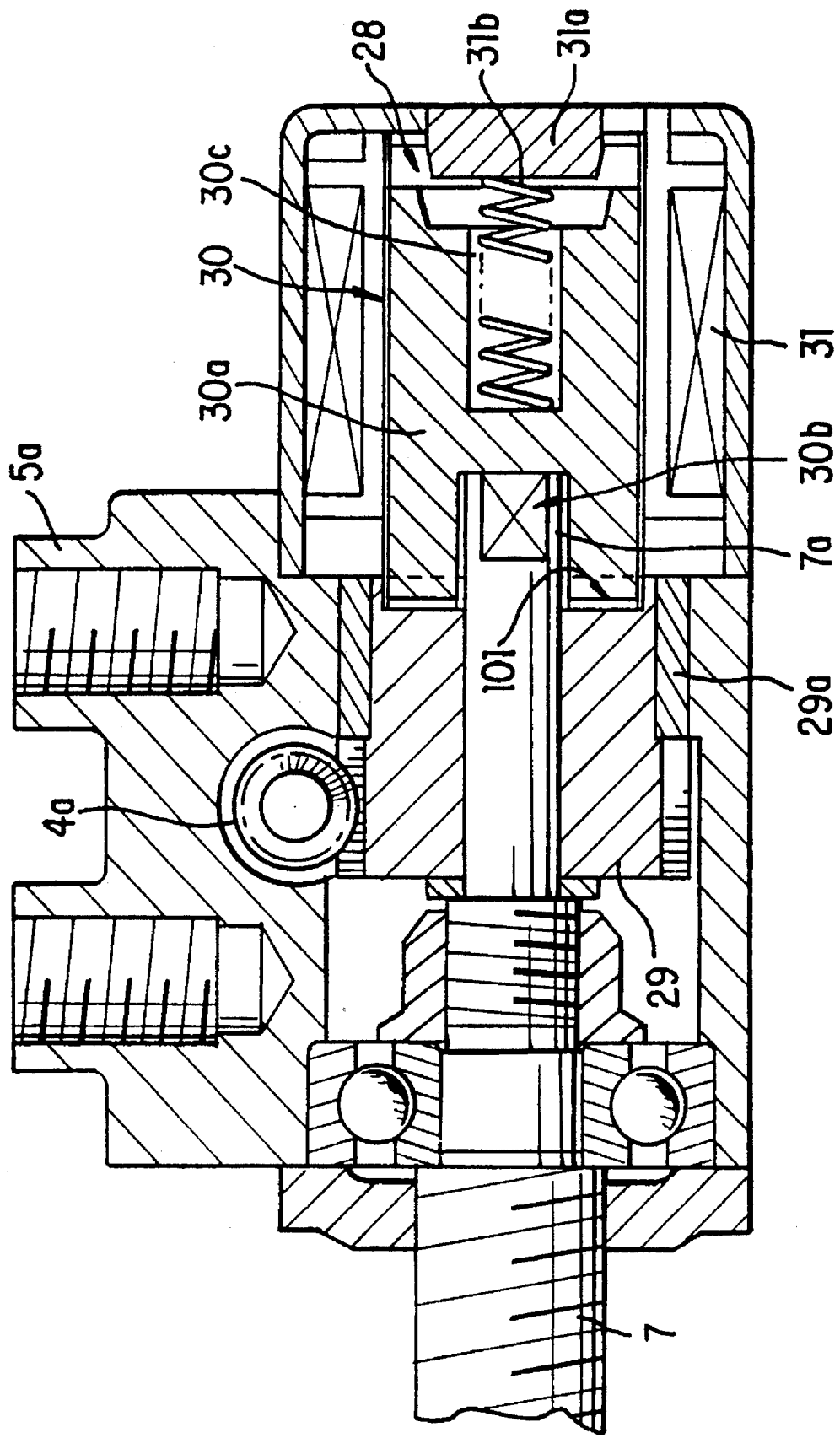
FIG. 3 is a cross-sectional view of a first clutch.

In the drawings, there are shown a seat 1 mounted in a vehicle, such as a private car at the right side facing a front part thereof (a side of a driver seat, e.g. a door is at its right side and a central console box is at its left side), and an electric driving assembly 2 of an embodiment of the present invention provided under the seat 1 for selectively performing forward and backward movement of the seat 1 and height adjustments of front and rear portions of the seat section.

The electric driving assembly 2 is integrally provided under the seat 1. In this embodiment, an output shaft 4 projecting in rightward and leftward directions from a single electric motor 3 constituting the electric driving device 2 is provided with two first and second rotating screw shafts 7 and 8 arranged in parallel with each other at a central portion (left side) and a door side (right side) of the vehicle, respectively, with their longitudinal axes toward front and rear ends of the car substantially perpendicular to the output shaft 4. First and second reducing gear mechanisms 5 and 6 are provided between the first and second rotating screw shafts 7 and 8 and the output shaft 4. The first and second reducing gear mechanisms 5 and 6 are integrally secured to a lower face of the seat 1. The front ends of the first and second rotating screw shafts 7 and 8 are interlocked and connected to the first and second reducing gear mechanisms 5 and 6 while the rear ends thereof are rotatably supported by a supporting member 1a projecting at a rear end section of the lower face of the seat 1. In this way, a power transmission path is formed to which a driving force of an electric motor 3 in a decelerated state is transmitted to the first and second rotating screw shafts 7 and 8.

Figure 4:
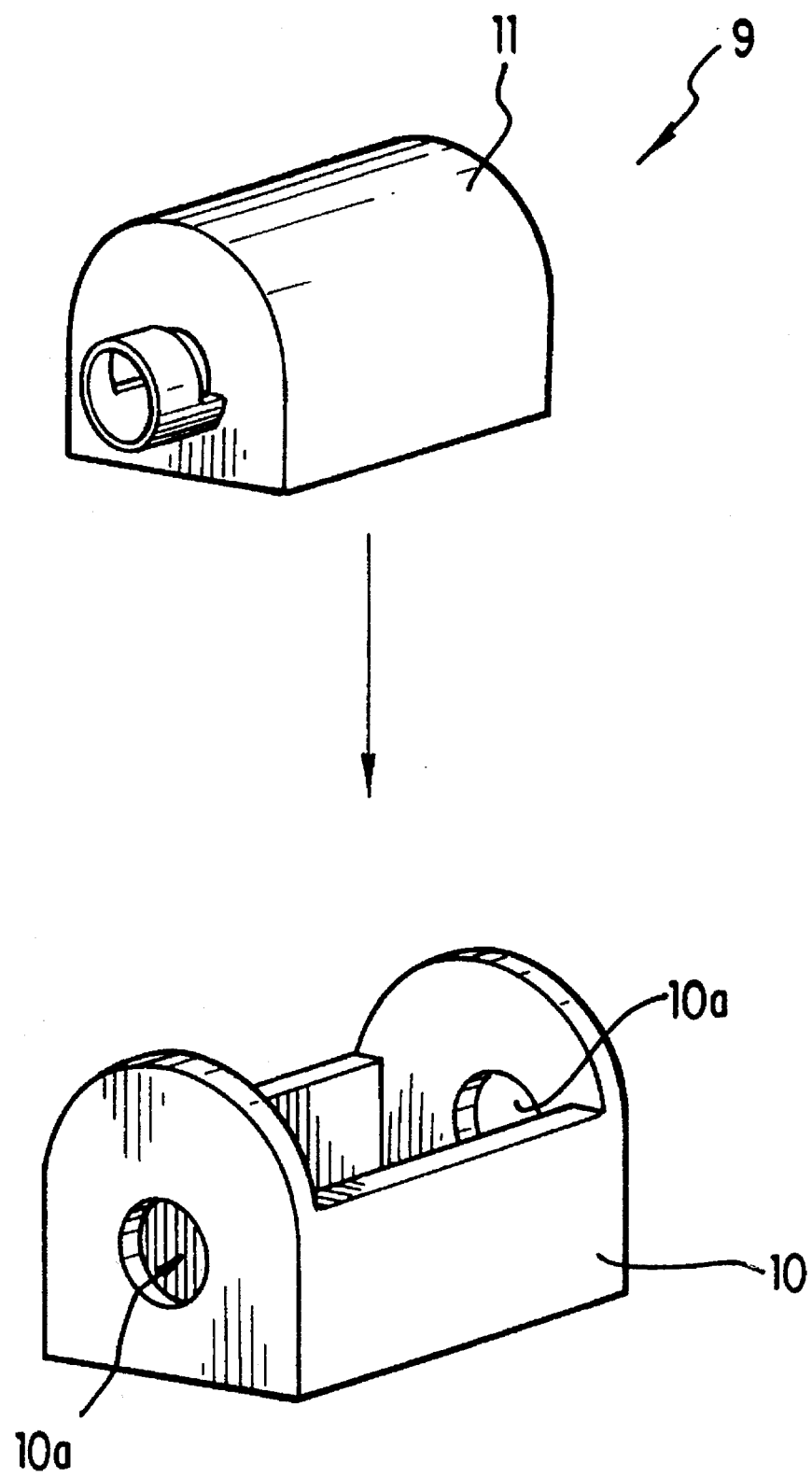
FIG. 4 is an exploded perspective view of a first tightening member.

A first tightening member 9 for performing forward and backward movement of the seat is screwed to the first rotating screw shaft 7 arranged in a narrow space of the central portion of the vehicle. The first tightening member 9 has a construction, for example, shown in FIG. 4 in which a tightener 11 screwed to the first rotating screw shaft 7 is fitted in a box-like casing 10 in a detent-like fashion. The casing 10 has through holes 10a through which the first rotating screw shaft 7 is loosely passed. The tightening member 9 has a small outside shape, and a lower face thereof is integrally secured to a supporting body 2a of the vehicle body. A first clutch 28 (described later) is provided in a power transmission path from the electric motor 3 to the first rotating screw shaft 7. With the actuation of a switch 1b provided at the seat 1 for forward and backward movement, the first clutch 28 is changed to an engaged state, and the first tightening member 9 is relatively moved on the first rotating screw shaft 7 based on a rotation of the electric motor 3, thereby adjusting forward and backward movement of the seat 1.

The first clutch 28 is provided at the first reducing gear mechanism 5. An output gear 4a of the electric motor 3 is meshed with an intermediate gear 29 provided at a case 5a of the first reducing gear mechanism 5 through a bearing 29a. The first rotating screw shaft 7 is rotatably passed through a shaft core portion of the intermediate gear in a condition such that the front end portion of the first rotating screw shaft 7 is projected forwardly. A cylindrical first plunger 30 is projected at the front of the intermediate gear 29. A rear end face of the first plunger 30 is detachably engaged with a front end face 101 of the intermediate gear 29. Bottomed cylindrical portions 30c and 30b are provided in front of and behind the first plunger 30 by means of a partition 30a, which is integrally formed at the middle portion of the plunger 30. A projected front end portion of the first rotating screw shaft 7 is fitted into the cylindrical portion 30b formed behind the first plunger 30. A chamfer 7a is formed at the projected front end portion of the first rotating screw shaft 7, and the first rotating screw shaft 7 is connected to the first plunger 30 so as to be rotated together with the first plunger 30 and movable in the axial direction. A first clutch spring 31b is provided between a bottom face of the cylindrical portion 30c formed in front of the first plunger 30 and a yoke plate 31a of a first exciting coil 31 fitted onto the outer periphery of the first plunger 30. The exciting coil 31 disposed about periphery of the first plunger 30 defines an electromagnetic member.

When the first exciting coil 31 is in a non-excited state, the first clutch spring 31b is urged so that the first plunger 30 is positively engaged with the intermediate gear 29, thereby making a driving force from the electrical motor 3 rotate the first rotating screw shaft 7 by way of the output gear 4a, the intermediate gear 29 and the first plunger 30 to engage the first clutch 28. On the other hand, when the first exciting coil 31 is in an excited state, the first plunger 30 is magnetically drawn toward the yoke plate 31a against the first clutch spring 31b to be removed from the intermediate gear 29, thereby shutting a transmission of the driving force from the electric motor 3 to the first plunger 30 to disengage the first clutch 28. The first clutch 28 is connected to the power transmission path as described above.

Two second tightening members 12 and 13 for performing vertical movement of the front and rear portions of the seat 1 are screwed to a second screw shaft 8 provided in a wide space of the door side. Second clutches 32 (described later) are provided inside the second tightening members 12 and 13. When a front height adjustment switch 1c is actuated to engage the second clutches 32, the second tightening members 12 and 13 make relative forward and backward movements to the second operating shaft 8 based on a rotation of the second rotating screw shaft 8. These second tightening members 12 and 13 are connected to height adjustment mechanisms 16 and 17, respectively, which are arranged in front of and behind the seat 1 and make relative movements separately on the second rotating screw shaft 8 to adjust the height of front and rear portions of the seat 1.

Figure 5:
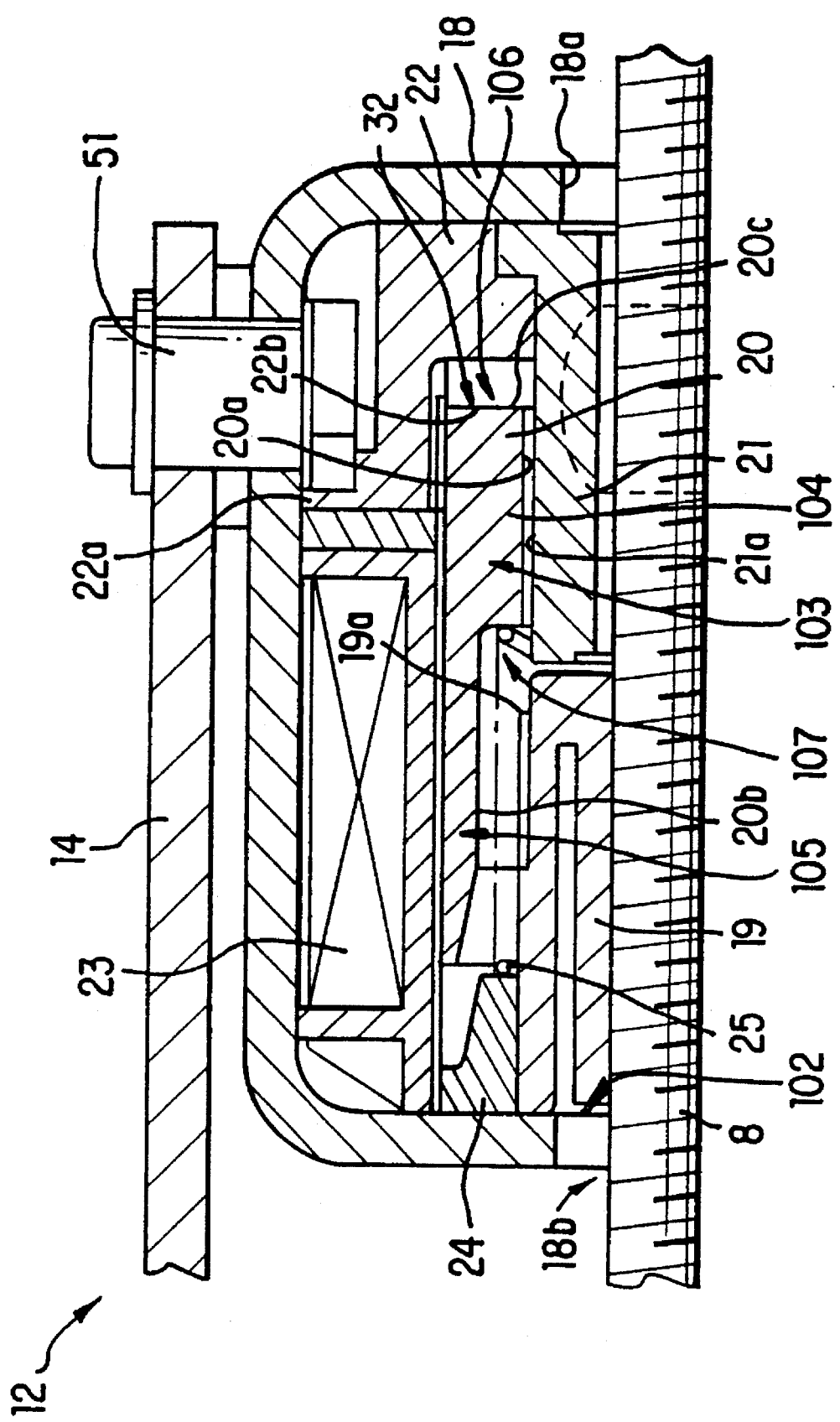
FIG. 5 is a horizontal sectional view of a main part of a second tightening member.

The second tightening members 12 and 13 to be screwed to the second rotating screw shaft are provided with clutch means. These second tightening members may have the construction, for example, shown in FIG. 5 although the invention is not meant to be limited thereto. For convenience, the second tightening member 12 will be described with reference to FIG. 5. The second tightening member 12 is provided in a box-like casing 18 having through holes 18a so as to be movable on the second rotating screw shaft 8. Casing 18 is connected to link 14 through pin like element 51. The casing 18 is made from a ferromagnetic material such as iron, cobalt or nickel. A cylindrical rotor 19 is provided in one side of the casing 18. The rotor 19 is formed so that an inner surface 102 thereof can be engaged with a retaining portion 8a formed at the second rotating screw shaft 8. The rotor 19 rotates together with the second rotating screw shaft 8 around the axis thereof and freely moves in the axial direction by loosely passing through the second rotating screw shaft 8. A first clutch receiving portion 19a is formed on one outer periphery of the rotor 19. A tightener 21 and one side of the rotor 19 are adjacent each other with a gap therebetween. The tightener 21 is screwed into the second rotating screw shaft 8, and several engaging grooves 21a in an axial direction are cut into the outer periphery thereof. A second cylindrical plunger 20 constitutes the second clutch 32. One half portion 103 of the second plunger 20 is formed in the shape of a small diameter inner cylinder 104, and mating grooves 20a are formed on the inner surface of the plunger 20. The mating grooves 20a are engageable with the engaging grooves 21a so that the second rotating screw shaft 8 is rotated around the axis thereof together with the second plunger 20 and is movable in the axial direction. The other half portion 105 of the second plunger 20 is a large diameter cylindrical portion 20b to which the rotor 19 is loosely fitted. When the second plunger 20 moves to one side, as described later, end portions of the mating grooves 20a are engaged with the first clutch receiving portion 19a formed on the rotor 19. Upon rotation of the second rotating screw shaft 8 under this condition, the second plunger 20 is rotated together with the second rotating screw shaft 8. Stop Discs are positioned on shaft 8 to prevent nut members from moving beyond the stop discs 50.

A clutch receiver 22 having a rectangular plate-like flange portion 22a is formed in the other side of the casing 18 so as to be fixed integrally to the casing 18. The second plunger 20 is fitted to the large diameter inner cylinder portion formed in one side of the clutch receiver 22, and the tightener 21 is loosely fitted to the small diameter inner cylinder portion in the other side of the clutch receiver 22. A second clutch receiving portion 22b engageable with an engaging portion 20c formed on one side surface of the second plunger 20 is formed on the surface of the stepped portion 107 between the large diameter cylinder portion 206 and the small diameter cylinder portion 104. A second exciting coil 23 is provided on the outer periphery of the second plunger 20, and a second yoke plate 24 facing the second plunger 20 is provided in one side of the casing 18, respectively, and a second clutch spring 25 is provided between the second yoke plate 24 and the second plunger 20.

When the second exciting coil is in a non-excited state, a second clutch 32 is in an engaged state where the second plunger 20 is positively engaged with the clutch receiving body 22 due to a resilient force of the second clutch spring 25, and the tightening member 12 makes relative movement on the second rotating screw shaft 8 upon driving the electric motor 3. Tightener 21 is a nut member which is prevented from rotating and the interaction of its threads with the threads on screw 8 cause axial movement of tightener 21 which in turn simultaneously axially moves tightening member 12. On the other hand, when the second exciting coil is in an excited state, the second clutch is in a disengaged state where the second plunger 20 moves to one side against the second clutch spring 25 to be engaged with the first clutch receiving portion 19a, and the tightening member 12 does not make relative movement even when the second rotating screw shaft 8 is rotated.

In the embodiment described above, adjustment of forward and backward movement or vertical movement of the front and rear portions of the seat 1 may be selectively performed. In case of adjustment of forward and backward movement of the seat 1, the switch 1b provided at the door side for forward and backward movement is actuated to turn off electricity of the first exciting coil 31 of the first clutch 28 and to send an electric current to the second exciting coil 23 of the second clutch 32 provided in the second tightening members 12 and 13. By driving the electric motor 3 under this condition, the first tightening member 9 is driven, and the second tightening members 12 and 13 become disengaged, thereby performing only adjustment of forward and backward movement of the seat 1. In case of height adjustment of the front portion of the seat 1, a front height adjustment switch 1c is actuated to turn off electricity of the second exciting coil of the tightening member 12 for front height adjustment and to turn on electricity of the second exciting coil 23 and the first exciting coil 31 provided in the tightening member 13 for rear height adjustment. By driving the electric motor 3 under this condition, the tightening member 12 moves forward and backward, thereby adjusting the front height of the seat 1.

According to the embodiment of the present invention, forward and backward movement and vertical movement of the front and rear portions of the seat 1 may be automatically performed by the driving force of a single electric motor 3. The adjustments may be performed by selectively turning on and off electricity to the first and second exciting coils 31 and 23 corresponding to the first and second clutches 28 and 32. Driving and controlling of these several adjustment mechanisms may be conducted by a driving force of the single electric motor, and it is not necessary to provide specialized motors for each of the adjustment mechanisms. As a result, it becomes possible to reduce the amount of seat adjusting parts, thereby reducing weight, size and cost of the assembly, and simplifying the assemblage.

Further, the first tightening member 9, which is not provided with a clutch and which has a small outside shape, is screwed to the first rotating screw shaft 7 positioned at the central portion of the vehicle. As a result, at the central portion of the vehicle where it is difficult to secure a wide mounting space due to arrangement of the transmission for various wiring and a propeller shaft, the first clutch 28 and the first tightening member 9 are separated, thereby obtaining a comfortable arrangement of the first clutch and the first tightening member 9.

On the other hand, a pair of tightening members 12 and 13 each having the second clutch 32 are arranged at a portion of the vehicle, such as a door side where no transmission is provided and a wide mounting space can be secured. These tightening members 12 and 13 are operated separately not only from each other but from forward and backward movement of the seat 1. The first rotating screw shaft 7 arranged at a narrow mounting space is used for the adjustment of forward and backward movement of the seat, and the height adjustment of the front and rear portion of the seat 1 is performed by the second rotating screw shaft 8 capable of securing a wide mounting space, and large-sized tightening members 12 and 13 each having the second clutch 32 are arranged to the second rotating screw shaft 8. When several seat operations are performed, arrangement of the clutches and the tightening members corresponding to functions of the seat operation may be secured in accordance with the mounting space, thereby reducing a size of the assembly without sacrificing a cabin of the vehicle.

Figure 6:
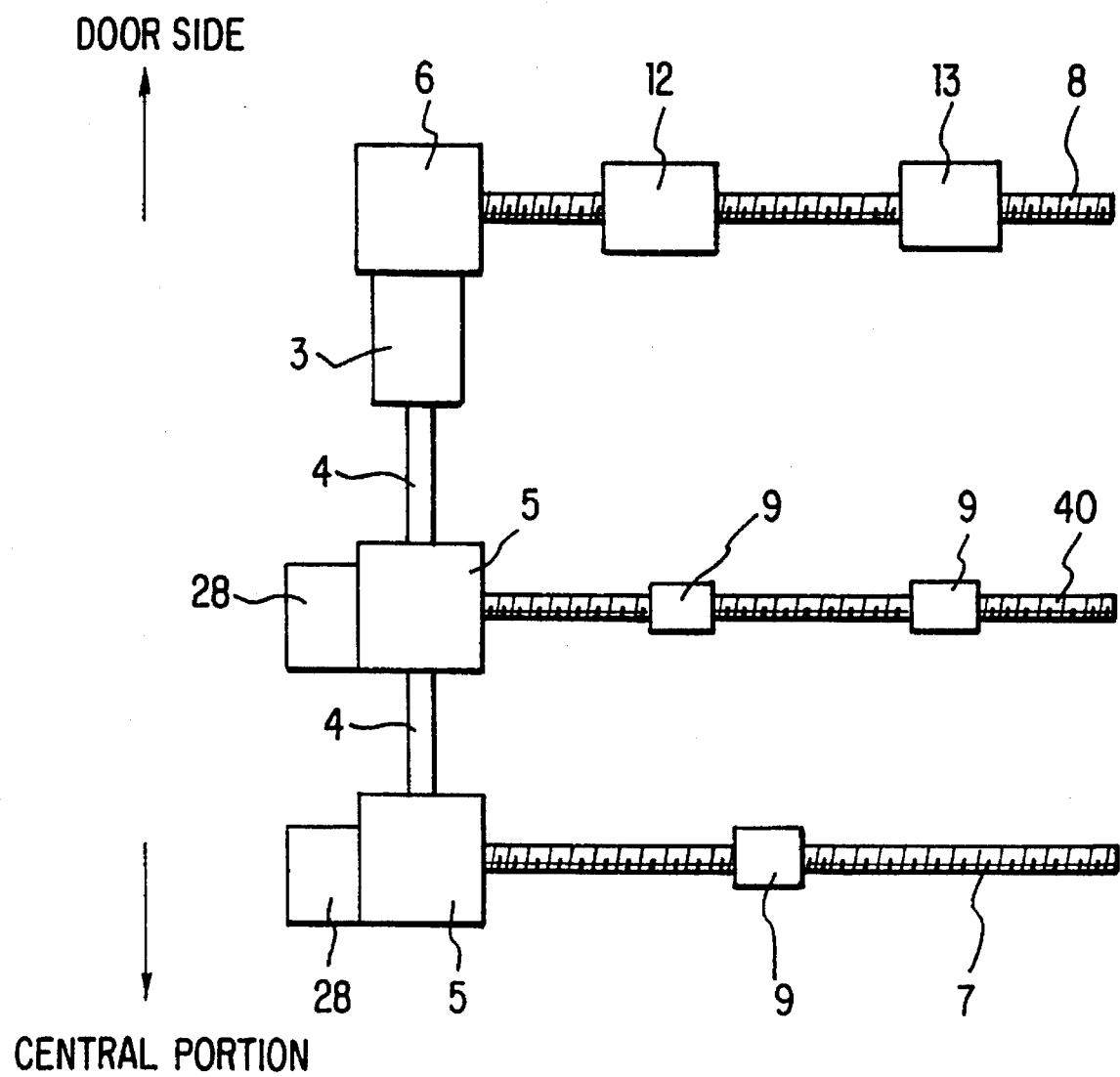
FIG. 6 is a schematic illustration showing a second embodiment according to the present invention.

The present invention is not limited to the embodiment as described above. As an arrangement of the electric driving assembly using a rotating screw shaft and a tightening member, a tightening member having a clutch for performing additional seat operation such as a reclining and a massage operation of a seat back, and vertical movement of the headrest may be screwed to a rotating screw shaft arranged at a door side. In addition, as the second embodiment of the present invention shown in FIG. 6, an intermediate rotating screw shaft 40 (several rotating screw shafts may be available) may be provided. When the intermediate rotating screw shaft 40 is provided with a clutch on the way along the power transmission path as the rotating screw shaft arranged at the central portion of the vehicle, the tightening member screwed to the rotating screw shaft 40 is operated at the same time the seat is moved forward and backward. When the intermediate rotating screw shaft 40 is not provided with a clutch in the power transmission path, and a tightening member having a clutch is screwed thereto as the rotating screw shaft arranged at the door side, separate seat operation may be performed, and selecting and setting of the intermediate rotating screw shaft corresponding to various seat operations may be freely performed.

According to the construction of the multi-driving assembly of a vehicle power seat of the present invention as described above, forward and backward movement and vertical movement of the seat may be selectively performed by switching between first and second clutches. As a result, multiple seat operations may be performed with one electric motor, and it is not necessary to provide other electric motors corresponding to each movement of the seat, thereby effectively reducing parts counts, weight and size of the assembly.

Further, at the central portion of the vehicle where it is difficult to secure a wide mounting space due to arrangement of the transmission for various wiring and a propeller shaft, the first clutch is provided in the power transmission path toward the rotating screw shaft, and a small-sized tightening member having no clutch for forward and backward movement of the seat is screwed to the rotating screw shaft, thereby mounting the tightening member at a narrow mounting space. At the door side of the vehicle where no harness or the like is provided and a wide mounting space can be obtained, a pair of large-sized tightening members each having the second clutch are secured to the rotating screw shaft, thereby separately and selectively performing forward and backward movement of the entire seat, vertical movement of the front portion of the seat, and vertical movement of the rear portion of the seat. Therefore, the clutches and the tightening members corresponding to each seat operation are ideally arranged in accordance with the mounting space, thereby reducing a size of the assembly without sacrificing a cabin of the vehicle.

Still further, when the rotating screw shaft provided with the first clutch used for forward and backward movement of the seat, the tightening member can be made small to secure a sufficient movement stroke of the seat.

While the invention has been described in detail with reference to preferred embodiments thereof, which are intended to be illustrative but not limiting, various changes may be made without departing from the spirit of scope of the invention, which is defined in the following claims.

What is claimed is:

1. A multi-driving assembly of a vehicle power seat for a plurality of operating mechanisms of the seat including at least a forward and backward moving mechanism for the seat and a vertical moving mechanism for front and rear portions of the seat, the multi-driving assembly comprising:
   a single electric motor;
   first and second rotatable screw shafts arranged substantially parallel with one another between said front and rear portions of the seat and rotated by a motor driving force from said electric motor;
   a first tightening member secured to said first rotatable screw shaft and connected to one of said plurality of operating mechanisms of the seat, said first rotatable screw shaft being arranged at a central portion of the vehicle;
   a second tightening member secured to said second rotatable screw shaft and connected to one of said plurality of operating mechanisms of the seat, said second rotatable screw shaft being arranged at a door side of the vehicle, wherein first and second clutches are provided in a power transmission path passing through said electric motor to each of said plurality of operating mechanisms of the seat in order to switch each of said plurality of operating mechanisms from a power-on state to a power-off state;
   said first clutch comprising;
      an intermediate gear operatively coupled with an output shaft of said electric motor, said first rotatable screw shaft rotatably passing through and coaxial with said intermediate gear; and
   a rotatable plunger axially movable between a first position and a second position, said plunger being selectively engageable at a first end with said intermediate gear in said first position for rotation with said intermediate gear, said first rotatable screw shaft being fixed to said rotatable plunger for rotation with said rotatable plunger.

2. A multi-driving assembly according to claim 1, wherein said first tightening member is fixed to a supporting body of the vehicle providing for forward and backward movement of the seat.

3. A multi-driving assembly according to claim 1, wherein said first clutch further comprises a yoke plate adjacent a second end of said rotatable plunger opposite said first end, and a spring disposed between said rotatable plunger and said yoke plate, said spring urging said rotatable plunger toward said first position.

4. A multi-driving assembly according to claim 3, wherein said first clutch further comprises an exciting coil disposed about an outer periphery of said rotatable plunger, said exciting coil and said rotatable plunger defining an electromagnetic member, wherein when said exciting coil is in an excited state said rotatable plunger is urged against said spring toward said yoke plate in said second position, and wherein said rotatable plunger is disengaged from said intermediate gear in said second position.

5. A multi-driving assembly according to claim 1, further comprising urging means for urging said rotatable plunger toward said first position, wherein said rotatable plunger comprises a first cylindrical portion receiving said first rotatable screw shaft and a second cylindrical portion receiving said urging means.

6. A multi-driving assembly according to claim 5, wherein said first clutch further comprises a yoke plate adjacent a second end of said rotatable plunger opposite said first end, and wherein said urging means comprises a spring disposed between said rotatable plunger and said yoke plate.

7. A multi-driving assembly of a vehicle power seat for at least forward and backward movement of the seat and vertical movement of front and rear portions of the seat, the multi-driving assembly comprising:
   a single driving motor;
   a first rotatable screw shaft selectively operatively coupled to said motor;
   a first tightening member threadedly connected to said first rotatable screw shaft, said first tightening member fixed to a supporting body of the vehicle;
   a second rotatable screw shaft selectively operatively coupled to said motor;
   a second tightening member threadedly connected to said second rotatable screw shaft, said second tightening member fixed to at least one height adjustment mechanism;
   a first clutch disposed in a power transmission path between said motor and said first rotatable screw member, said first clutch engaging and disengaging said motor and said first rotatable screw member;
   a second clutch disposed in a power transmission path between said motor and said second rotatable screw member, said second clutch engaging and disengaging said motor and said second rotatable screw member;
   said first clutch comprising;
      an intermediate gear operatively coupled with an output shaft of said electric motor, said first rotatable screw shaft rotatably passing through and coaxial with said intermediate gear; and
      a rotatable plunger axially movable between a first position and a second position, said plunger being selectively engageable at a first end with said intermediate gear in said first position for rotation with said intermediate gear, said first rotatable screw shaft being fixed to said rotatable plunger for rotation with said rotatable plunger.

8. A multi-driving assembly according to claim 7, wherein said first clutch further comprises a yoke plate adjacent a second end of said rotatable plunger opposite said first end, and a spring disposed between said rotatable plunger and said yoke plate, said spring urging said rotatable plunger toward said first position.

9. A multi-driving assembly according to claim 8, wherein said first clutch further comprises an exciting coil disposed about an outer periphery of said rotatable plunger, said exciting coil and said rotatable plunger defining an electromagnetic member, wherein when said exciting coil is in an excited state said rotatable plunger is urged against said spring toward said yoke plate in said second position, and wherein said rotatable plunger is disengaged from said intermediate gear in said second position.

10. A multi-driving assembly according to claim 7, further comprising urging means for urging said rotatable plunger toward said first position, wherein said rotatable plunger comprises a first cylindrical portion receiving said first rotatable screw shaft and a second cylindrical portion receiving said urging means.

11. A multi-driving assembly according to claim 10, wherein said first clutch further comprises a yoke plate adjacent a second end of said rotatable plunger opposite said first end, and wherein said urging means comprises a spring disposed between said rotatable plunger and said yoke plate.

* * * * *